United States Patent [19]
Shealy

[11] Patent Number: 5,350,183
[45] Date of Patent: Sep. 27, 1994

[54] STEERABLE AXLE ASSEMBLY WITH PRELOADED KINGPIN DRAWKEYS

[75] Inventor: Noah A. Shealy, Fort Wayne, Ind.

[73] Assignee: Dana Corporation, Toledo, Ohio

[21] Appl. No.: 953,203

[22] Filed: Sep. 29, 1992

Related U.S. Application Data

[63] Continuation of Ser. No. 554,098, Jul. 17, 1990, abandoned, which is a continuation of Ser. No. 326,692, Mar. 21, 1989, abandoned.

[51] Int. Cl.$^5$ .............................................. B62D 7/18
[52] U.S. Cl. ................................... 280/96.1; 403/355; 403/379
[58] Field of Search ............... 280/96.1, 660; 403/355, 403/379, 318; 411/153, 152, 155, 156, 186, 189

[56] References Cited

U.S. PATENT DOCUMENTS

| | | | |
|---|---|---|---|
| Re. 19,432 | 3/1935 | Winchester et al. | 411/155 |
| 302,519 | 7/1884 | Parsons | 403/355 |
| 436,737 | 9/1890 | Lewis | 411/156 |
| 1,497,742 | 6/1924 | Shaw | 280/96.1 |
| 1,775,765 | 9/1930 | Hennessy | 403/379 |
| 1,859,149 | 5/1932 | Meggs | 280/96.1 |
| 1,865,202 | 6/1932 | Milligan | 280/96.1 |
| 2,916,295 | 12/1959 | Sandberg | 280/96.1 |
| 3,913,649 | 10/1975 | Stanaitis | 411/155 |
| 3,915,469 | 10/1975 | Vanice | 280/96.1 |
| 4,229,017 | 10/1980 | Hagedorn | 280/96.1 |

FOREIGN PATENT DOCUMENTS

| | | | |
|---|---|---|---|
| 52-9757 | 1/1977 | Japan | 411/152 |
| 395321 | 10/1931 | United Kingdom | 411/155 |

OTHER PUBLICATIONS

H. J. Stewart, Belleville Spring Washers (date unknown).
Machine Design, The Fasteners Book W. M. Hanneman "Washers" pp. 54–57 Sep. 29, 1960.

*Primary Examiner*—Karin L. Tyson
*Attorney, Agent, or Firm*—Finnegan, Henderson, Farabow, Garrett & Dunner

[57] ABSTRACT

A steerable axle assembly incorporates an improved kingpin securement system for accommodating wear during the useful life of the kingpin. The assembly defines a steering axle boss having a vertically oriented bore. A pivotal steering knuckle is secured to the boss. A cylindrical kingpin is supported within the bore and extends through apertures in the knuckle to retain the knuckle on the boss. The boss includes a cross aperture which extends transversely to and partially intersects the bore. A drawkey, supported within the cross aperture, includes an elongated head having a tapered flat surface adapted to engage the kingpin. The drawkey includes a threaded shaft portion which has an end extending externally of the cross aperture, and a nut threaded on the shaft portion for securement of drawkey the against the kingpin. A disc spring washer is secured about the threaded shaft portion of the drawkey, between the nut and an exterior surface of the boss for preloading the drawkey against the kingpin. In a preferred form, the taper on the drawkey is within a range of 5–10 degrees, while the preferred load deflection accommodated by the disc spring washers is approximately 30 thousandths of an inch.

9 Claims, 1 Drawing Sheet

STEERABLE AXLE ASSEMBLY WITH PRELOADED KINGPIN DRAWKEYS

This application is a continuation, of application Ser. No. 07/554,098 filed Jul. 17, 1990, now abandoned, which is a continuation of application Ser. No. 07/326,692, filed Mar. 21, 1989, now abandoned.

BACKGROUND OF THE INVENTION

This invention relates to steerable axle assemblies of the type utilizing kingpins for securement of steering knuckles to steering axle bosses. More particularly, this invention relates to apparatus designed to retain a kingpin against rotational movement within an axle boss, notwithstanding wear during the useful life of the kingpin.

In conventional front suspension systems for highway vehicles such as trucks, wheel spindles are connected to a front axles through steering knuckle and kingpin members. Typically, the knuckle has a bifurcated yoke for coupling the knuckle to a fixed axle boss, and the kingpin extends through aligned apertures in the yoke and a bore in the axle boss to retain the members together. The normally vertically oriented axle boss, designed to support the steering knuckle, is an integral part of the front axle. The knuckle is adapted to pivot about the kingpin on a vertical steering axis.

The axle boss, also called a knuckle support boss, thus non-rotatably retains the kingpin but permits rotation of the knuckle. A roller bearing mounted between the knuckle support and the lower arm of the bifurcated yoke permits low frictional movement of the knuckle about the steering axis. The upper arm generally supports a bushing for accommodating a lesser load.

Due to manufacturing tolerances, the kingpin roller bearing and bushing are often not precisely fitted between lower and upper arms of the knuckle yoke. The resulting gaps or clearances allow the members to shift relative to one another, particularly as a result of wear over the useful life of the parts. In heavy duty truck suspension systems, kingpins are normally secured against rotation by means of drawkeys having tapered surfaces drawn against the sides of the kingpins. However, as a result of wear, greater clearances are created, permitting the kingpins to shift and oscillate within their associated knuckle bores during the useful lives of the parts. Such movement exacerbates the wear problem.

SUMMARY OF THE INVENTION

In accordance with the present invention, a steerable axle assembly provides a preloaded kingpin drawkey system which closes up clearances created by wear within the kingpin and steering axle boss interface. In a preferred form, the assembly includes a transverse axle beam having a pair of vertically oriented knuckle support bosses at its ends. Each of the bosses has vertically spaced ends and a bore extending fully between the ends. A steering knuckle is pivotally secured to each boss by upper and lower arms having aligned apertures. A cylindrical kingpin extends through the bore of the boss and the apertures of the arms to retain the steering knuckle on the boss, Each boss contains a cross aperture extending transversely to and partially intersecting the bore, and a drawkey is supported within each cross aperture. Each drawkey includes an elongated head having a tapered flat surface adapted to engage the kingpin. The drawkey has a threaded shaft portion opposite the head, the end of which extends externally of the cross aperture. A drawkey nut is threaded on the end of the threaded shaft portion for securing the drawkey head against the kingpin. A disc spring washer is utilized to preload the drawkey against the kingpin by virtue of its position between the boss and the nut. In a preferred form, the disc spring washer is a Belleville spring which provides a relatively constant tensile load under a deflection of up to 30 thousandths of an inch per drawkey.

DETAILED DESCRIPTION OF A PREFERRED EMBODIMENT

Figure 1:
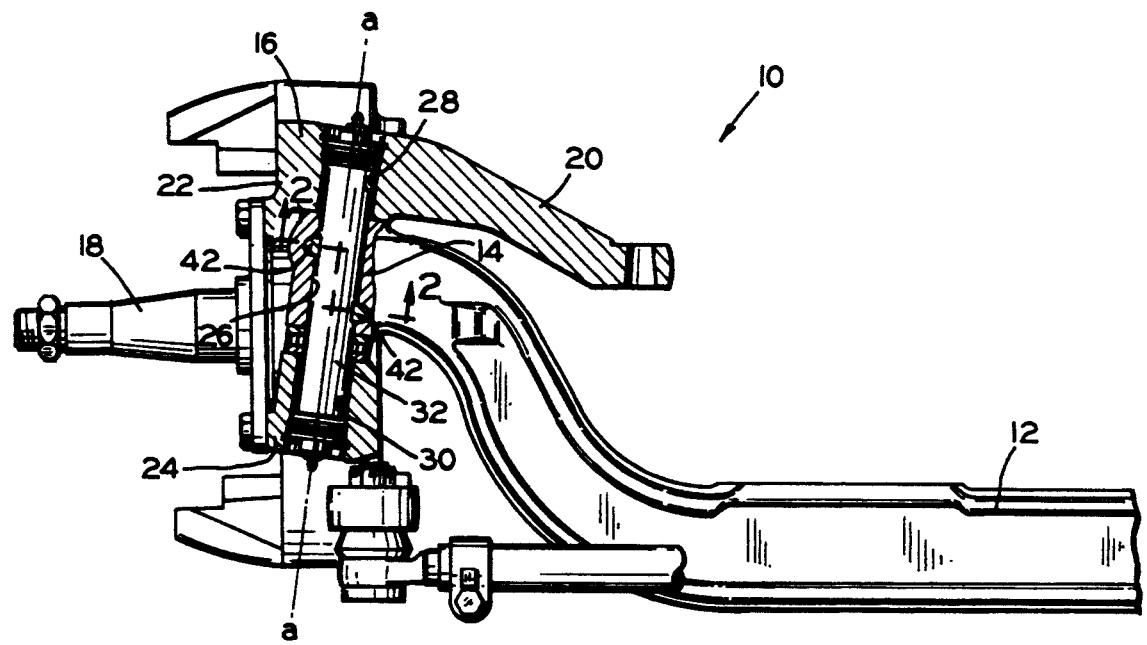
FIG. 1 is a fragmentary elevation of one end of a steerable axle assembly which incorporates a preferred embodiment of the present invention.

Referring initially to FIG. 1, a fragmentary view of a steerable axle assembly depicts one end (driver's side only) of a transverse front axle beam 12. The beam includes a vertically oriented axle boss 14 pivotally supporting a steering knuckle 16. The knuckle 16 includes a conventional wheel spindle 18, and has a steering arm 20 which extends oppositely of the spindle The steering arm 20 is conventionally connected to linkage (not shown), which includes a pitman arm coupled to a manually operative steering wheel controlled by the driver of a vehicle. The steering knuckle 16 includes upper and lower arms 22, 24, which together define a bifurcated yoke for coupling the knuckle to the boss 14 by means of a cylindrical kingpin 32.

The boss 14 includes an internal vertically oriented bore 26, while the upper and lower arms 22 and 24 contain apertures 28 and 30, respectively, for connection to the cylindrical kingpin 32. As will be appreciated by those skilled in this art, the kingpin, secured within the bore and apertures by conventional means, supports the steering knuckle 16 for pivotal movement with respect to the boss 14, whereby wheels (not shown) carried by the spindle 18 may be swivelled about a relatively vertical steering axis "a—a" defined by the centerline of the bore 26.

Figures 2, 3:
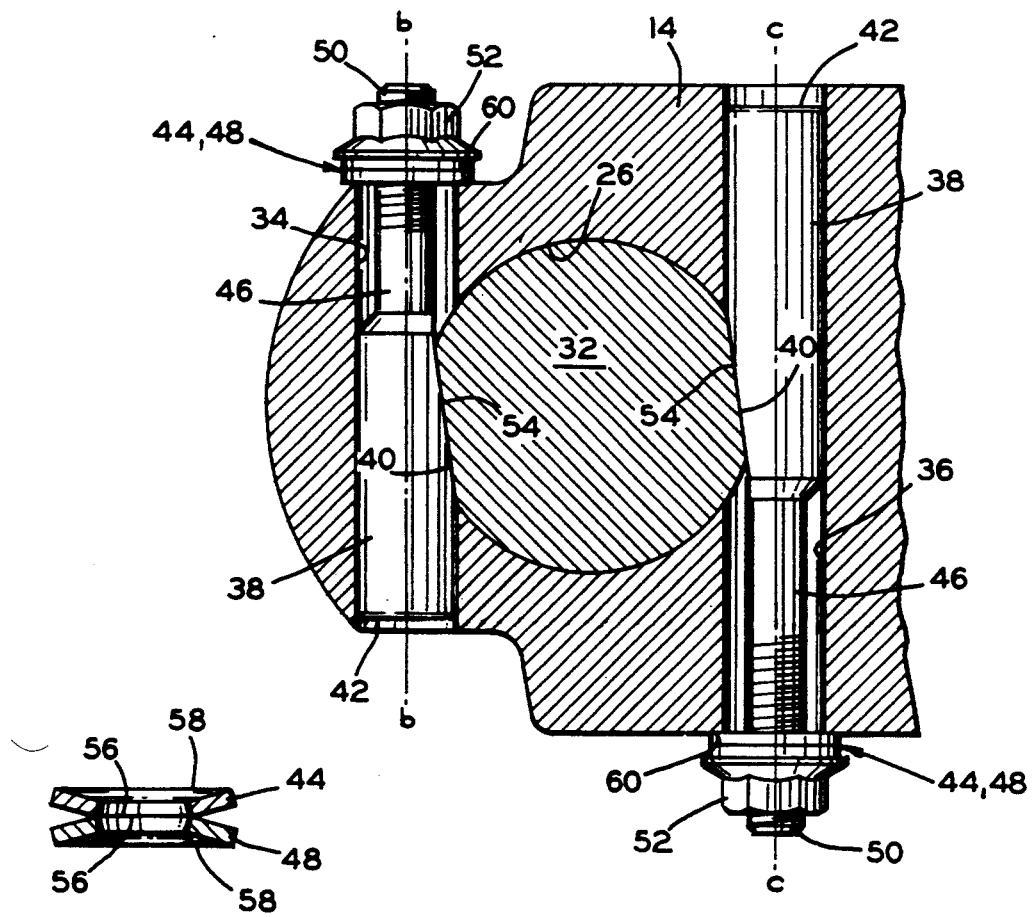
FIG. 2 is a cross-sectional view of a kingpin and steering axle boss, as viewed along lines "2—2" of FIG. 1.
FIG. 3 is a cross-sectional side view of a pair of disc spring washers utilized in a preferred form of the present invention, wherein the washers are represented in their unstressed form prior to torquing of the drawkey nut.

Referring now to FIG. 2, a cross sectional view of the kingpin 32 and the steering knuckle support boss 14 is presented. Left and right hand cross apertures 34 and 36, respectively, support a pair of drawkeys 42 which are disposed on opposite sides of the kingpin 32 as shown. Each drawkey 42 includes a head 38 having a tapered flat 54. Each flat 54 is designed to engage a mating flat 40 on opposite sides of the kingpin, so that the kingpin will be effectively restrained from rotation within the bore 26.

Each drawkey also has a non-threaded shaft portion 46 integral with the head 38. Projecting from the non-threaded shaft portion is a threaded shaft end 50 which extends externally of the cross aperture 34, 36. Each drawkey is secured in place by a drawkey nut 52 torqued to a tensile load of approximately 40 to 50 thousand pounds per square inch.

A pair of disc spring washers 44, 48 is interposed between the nut 52 and the aperture extremity area 60 of the axle boss 14 as shown. In the preferred form, the disc spring washers comprise Belleville springs, which, when the nuts 52 are torqued, become flattened as shown in FIG. 2. Although the Belleville spring is preferred, there may, however, be other springs which have similar load-deflection capacities.

Referring now to FIG. 3, one pair of Belleville springs 44, 48 is shown in a non-loaded or uncompressed form. FIG. 3 depicts a preferred method of stacking the Bellevilles such that their inner circumferential portions 56 come into contact with each other while their outer circumferential portions 58 are adapted for making bearing contact respectfully with the nut 52 and the external aperture extremity area 60. The Belleville 44, 48 are adapted to preload the drawkeys to compensate for wear of the kingpin, and will have a characteristic load curve which is a relatively flat over a wide deflection range. Thus, over a range of 30 thousandths of an inch of deflection, the pair of Bellevilles 44, 48 will provide a relatively constant force effective to avoid slack or clearance due to kingpin wear, permitting up to 30 thousandths of an inch of movement of the drawkey against the kingpin. In the preferred form, the Bellevilles have a Rockwell hardness in the range of 45–50, and are fabricated of a high carbon steel material. All other materials for-kingpins, boss, etc. are as conventionally practiced by those skilled in this art.

Finally, in the same preferred form, the drawkeys are arranged so as to be parallel, but axially offset (see FIG. 1) along the kingpin 32, and the tapers fall within a range of 5–15 degrees as measured with respect to the axes "b—b" and "c—c" of the drawkeys. Also in the preferred embodiment, each drawkey head is elongated to the extent of its being greater in length than the total threaded end and non-threaded intermediate shaft portions of the drawkeys. Moreover, the drawkeys are reversely oriented.

Although only one preferred embodiment has been detailed and described herein, the following claims envision numerous alternative embodiments which will fall within the spirit and scope thereof.

What is claimed is:

1. In a steerable axle assembly including a transverse axle beam defining an elongated vertically oriented boss at one end, said boss defining a pair of vertically spaced ends and having a bore extending fully between said ends, said assembly further including a pivotal steering knuckle defining a bifurcated yoke having upper and lower arms, said arms including aligned apertures adapted to mate with opposed ends of said bore, said assembly further including a cylindrical kingpin supported within said bore and extending through said apertures, said boss comprising a cross aperture extending transversely to and partially intersecting said bore, a drawkey supported within said cross aperture, said drawkey including an elongated head having a tapered flat surface adapted to engage said kingpin, wherein said kingpin has a tapered flat surface for mating with said tapered flat surface on said head of said drawkey, said drawkey including a threaded shaft portion having an end extending externally of said cross aperture, said end having a nut threaded thereon for securement of said drawkey against said kingpin; an improvement comprising spring means interposed between said boss and said nut for preloading said drawkey against said kingpin and for providing a relatively constant force to avoid slack or clearance due to kingpin wear, wherein said spring means comprise two deflecting disc spring washers positioned about said threaded shaft portion of said drawkey, each washer defining inner and outer circumferential portions, said washers positioned so that in their uncompressed form, their inner portions are in contact with one another while their outer portions bear against said boss and said nut, respectively.

2. The steerable axle assembly of claim 1 wherein upon assembly, the tension on said drawkeys is sufficient to deflect said disc spring washer to a fully flattened position.

3. The steerable axle assembly of claim 1 wherein said tensile load on said drawkey is within a range of 40 to 50 thousand pounds per square inch.

4. The steerable axle assembly of claim 3 further comprising a second drawkey positioned in parallel with but axially offset from said first drawkey, said kingpin including a second tapered flat surface positioned 180 degrees from said first tapered flat surface on said kingpin, said second surface axially offset from said first surface, and wherein said second drawkey also contains a disc spring washer and nut associated therewith, whereby said disc spring washers operate in parallel to provide a relatively constant tensile load under total deflection of up to 30 thousandths of an inch per drawkey.

5. The steerable axle assembly of claim 4 wherein said boss comprises a pair of cross apertures and wherein each of said deflecting disc spring washers comprises a Belleville washer.

6. The steerable axle assembly of claim 5 wherein said drawkeys and said tapers are correspondingly aligned and parallel to one another, said tapers being within a range of 5–10 degrees with respect to the axes of each drawkey.

7. The steerable axle assembly of claim 6 wherein elongated heads of said drawkeys are greater in length than said shaft portions of said drawkeys.

8. The steerable axle assembly of claim 7 wherein said drawkeys are reversely oriented.

9. The steerable axle assembly of claim 1 wherein each of said deflecting disc spring washers comprises a Belleville spring washer, wherein together said Belleville spring washers provide a relatively constant tensile load on said drawkey under deflection of up to thirty thousandths of an inch.

* * * * *